(12) United States Patent
Rodriguez et al.

(10) Patent No.: US 12,464,629 B2
(45) Date of Patent: Nov. 4, 2025

(54) SYSTEMS AND METHODS FOR A MULTICHANNEL NAVIGATION LIGHT

(71) Applicant: SeaSatellites, Inc., San Diego, CA (US)

(72) Inventors: Dylan Rodriguez, San Diego, CA (US); Michael Flanigan, San Diego, CA (US)

(73) Assignee: SeaSatellites, Inc., San Diego, CA (US)

( * ) Notice: Subject to any disclaimer, the term of this patent is extended or adjusted under 35 U.S.C. 154(b) by 149 days.

(21) Appl. No.: 18/433,824

(22) Filed: Feb. 6, 2024

(65) Prior Publication Data

US 2025/0254782 A1    Aug. 7, 2025

(51) Int. Cl.
| | |
|---|---|
| *H05B 47/195* | (2020.01) |
| *H05B 45/34* | (2020.01) |
| *H05B 47/155* | (2020.01) |
| *H05B 47/17* | (2020.01) |

(52) U.S. Cl.
CPC ........... *H05B 47/195* (2020.01); *H05B 45/34* (2020.01); *H05B 47/155* (2020.01); *H05B 47/17* (2020.01)

(58) Field of Classification Search
CPC .... H05B 47/195; H05B 45/34; H05B 47/155; H05B 47/17
See application file for complete search history.

(56) References Cited

U.S. PATENT DOCUMENTS

| | | |
|---|---|---|
| 2009/0115336 A1 | 5/2009 | Wang |
| 2009/0303081 A1 | 12/2009 | Annati et al. |
| 2018/0050820 A1 | 2/2018 | Jha et al. |
| 2019/0159306 A1 | 5/2019 | Horst et al. |
| 2023/0133018 A1 | 5/2023 | Anderson |

FOREIGN PATENT DOCUMENTS

| | | | | |
|---|---|---|---|---|
| CN | 105554934 A | * | 5/2016 | ............ H05B 45/00 |
| CN | 103822138 B | * | 5/2018 | |
| WO | WO-9821917 A1 | * | 5/1998 | ............ B64D 47/06 |

* cited by examiner

*Primary Examiner* — Daniel D Chang
(74) *Attorney, Agent, or Firm* — Scale LLP (57) ABSTRACT

Disclosed are systems and methods for providing and operating a multichannel navigation light. The multichannel navigation light may include infrared light emitting diodes and visible light emitting diodes and may be operable in a plurality of modes. In a first mode, the infrared light emitting diodes may be powered on and the visible light emitting diodes may be powered off. In a second mode, the infrared light emitting diodes may be powered off and the visible light emitting diodes may be powered on. The modes may be selectable based on communications from a payload according to a protocol. The multichannel navigation light may determine the protocol by sampling one or more voltages of the payload's data lines and comparing the sample voltages to one or more conditions.

20 Claims, 4 Drawing Sheets

SYSTEMS AND METHODS FOR A MULTICHANNEL NAVIGATION LIGHT

TECHNICAL FIELD

Various aspects of the present disclosure relate generally to systems and methods for providing and operating a multichannel navigation light in autonomous or semi-autonomous vehicles capable of hosting a variety of payloads.

BACKGROUND

Generally, lighting components of conventional navigation systems only consist of visible light emitting diodes (LEDs) that emit light on a spectrum visible to the human eye. The incorporation of such LEDs often plays an instrumental role in the coordination/communication between vehicles navigating within a larger navigational network. In order to communicate effectively, the LEDs may be configured to emit certain standardized colors such as red, green, white, etc. While the advantages of incorporating visible LEDs into a navigation system are well explored, it is rare to find a system that utilizes LEDs configured to emit light on the invisible spectrum despite the fact that such LEDs can often be advantageous in certain situations. An example of such an LED is an infrared (IR) LED. For example, IR LEDs can be used to illuminate areas covertly since their emitted light is invisible to the human eye, making such LEDs useful in situations where detection is undesirable such as during clandestine operations. Because there are situations where using visible LEDs is preferred and situations where using IR LEDs is preferred, there is a need for a system with a combination of visible LEDs and IR LEDs, wherein the system is capable of coordinating operations for the two sets of LEDs. This implementation may allow the system to dynamically and/or autonomously switch the configuration of LEDs in use based on a situational context, mission parameters, or user instructions. There is a further need for this system to be modular so that it can be deployed as part of an autonomous or semi-autonomous vehicle, which itself may be deployed with one or more different payloads that communicate using different protocols.

The present disclosure is directed to overcoming one or more of these above-referenced challenges.

SUMMARY OF THE DISCLOSURE

Certain aspects of the disclosure include systems and methods for providing and operating a multichannel navigation light in autonomous or semi-autonomous vehicles capable of hosting a variety of payloads.

In some embodiments, a multichannel navigation light system may include a housing. The housing may include at least one top surface and a plurality of side surfaces. The multichannel navigation light system may include a plurality of infrared light emitting diodes and a plurality of visible light emitting diodes. The multichannel navigation light system may include at least one rigid printed circuit board affixed to the at least one top surface. The rigid printed circuit board may include at least one of the plurality of infrared light emitting diodes. The multichannel navigation light system may include at least one flexible printed circuit board affixed to the plurality of side surfaces. The flexible circuit board may include at least one infrared light emitting diode and at least one visible light emitting diode for each of the plurality of side surfaces. The multichannel navigation light system may include a microcontroller and a plurality of transceivers. The plurality of transceivers may comprise at least a first transceiver that communicates using a first protocol and a second transceiver that communicates using a second protocol that is different from the first protocol. The multichannel navigation light system may include a comparator that samples one or more voltages of one or more data lines connected to the plurality of transceivers and compares the one or more voltages to one or more conditions. The microcontroller may enable one of the first transceiver or the second transceiver based on the comparison to the one or more conditions. The multichannel navigation light system may be operable in at least a first mode and a second mode. In the first mode, the plurality of infrared light emitting diodes may be powered on and the plurality of visible light emitting diodes may be powered off. In the second mode, the plurality of infrared light emitting diodes may be powered off and the plurality of visible light emitting diodes may be powered on. The multichannel navigation light system may be switchable between the first mode and the second mode using one of the first protocol and the second protocol based on whether the first transceiver or the second transceiver is enabled.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

DETAILED DESCRIPTION

Various aspects of the present disclosure relate generally to systems and methods for providing and operating a multichannel navigation light system in autonomous or semi-autonomous vehicles capable of hosting a variety of payloads.

Prior art systems that include both visible light-emitting diodes (LEDs) and invisible LEDs such as infrared (IR) LEDs are incapable of dynamically and/or autonomously switching the mode of active LEDs based on a situational context, mission parameters, or user instructions. For example, in a conventional system, switching from a first mode where only visible LEDs are enabled to a second mode where only IR LEDs are enabled may require full manual control by the user. Such a task can be inconvenient for the user and limit the system's ability to be used reliably in dynamic or autonomous manner. Prior art systems are also incapable of interfacing with different payloads that communicate with different protocols. As will be described herein, a system may be configured with a modular, multi-protocol communication scheme that may allow for individual control (e.g., power-on/power-off, change brightness, etc.) of one or more sets of visible LEDs and/or IR LEDs without requiring manual intervention. In embodiments, the system further combines the sets of visible LEDs and IR LEDs in ways that maximize effectiveness (e.g., 360-degree visibility) and efficiency (e.g., limited energy consumption). The system described herein addresses the issues described above, along with other technical issues. In embodiments, such a system may be deployed on a vehicle, which may be an autonomous, semi-autonomous, self-driving, or driverless vehicle, which means it is capable of sensing its environment and moving with little or no human input. In other embodiments, the system may be deployed in a vehicle operable by a human/driver.

Figure 1A:
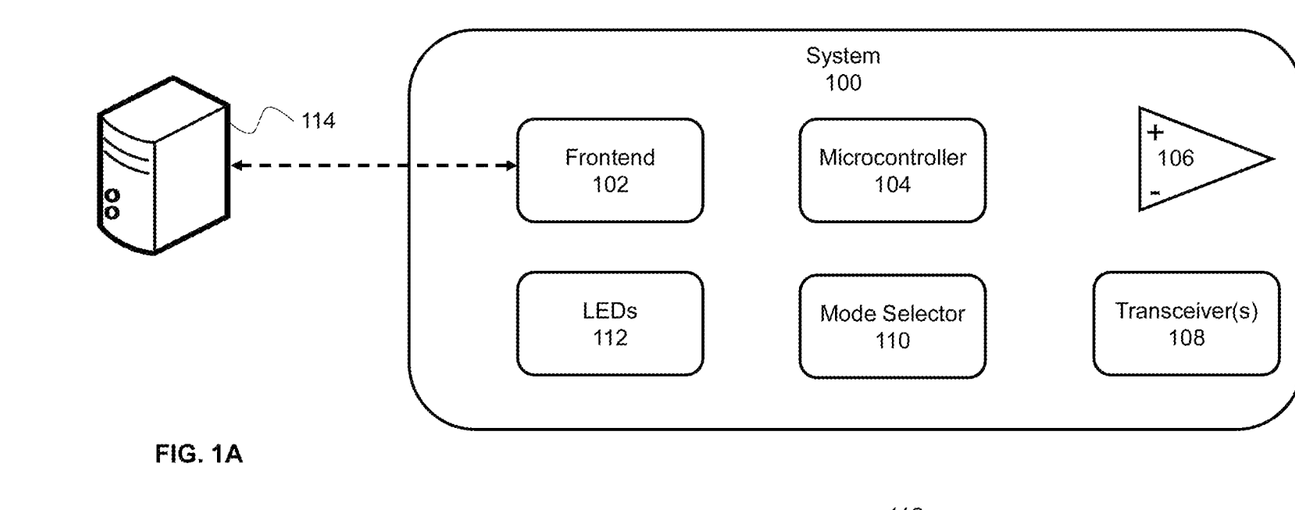
FIG. 1A shows an exemplary overview of an internal environment of a multichannel navigation light system.

FIG. 1A shows an exemplary overview of the internal environment of the multichannel navigation light system 100. As shown, the system 100 may include a frontend 102, a microcontroller 104, a comparator 106 coupled to one or more transceivers 108, a mode selector 110, and/or a plurality of light-emitting diodes 112 (LEDs). The system 100 may be communicatively coupled to a payload 114. Each of the aforementioned components are described further below.

The system 100 may include a physical housing with a top surface and a plurality of side surfaces. The design of the housing, including for example, the number and arrangement of side surfaces, may be useful in reducing the amount of light and/or energy that is wasted, which is described further with respect to FIG. 2. The system 100 may include and operate a processor (CPU) and/or a microcontroller 104 in order to perform one or more tasks related to processing information sent via different protocols, operating in one of a plurality of modes, and/or other techniques described herein. The system 100 may utilize frontend software/hardware components to receive information from payload 114 indicative of which mode to enter.

The frontend 102 may include a plurality of inputs (e.g., analog inputs) configured to receive signals (for example, from the payload 114 described below) indicative of information related to how to set a mode and/or other information that can be used by the system 100 when performing one or more operations. In some embodiments, the fidelity of the signal may be assessed in order for the system 100 to determine if any pre-processing should be performed to improve such fidelity. For example, one or more of the plurality of inputs may be coupled to respective differential amplifiers. The differential amplifiers may be configured to amplify differences in the received signals, thereby contributing to an improved signal fidelity. After processing and converting the raw input signals into a form manageable by the system 100, the signals may be obtained by the microcontroller 104.

The microcontroller 104 may include or may be in communication with a plurality of analog-to-digital converters (ADCs). The ADCs may be configured to convert the received signals to data that is in a form suitable for sampling. For instance, the ADCs may be connected to outputs of corresponding differential amplifiers and may convert the differential signals to data (e.g., which may take the form of data lines that may be connected to the plurality of transceivers 108 described below). The microcontroller 104 of the system 100 described above may be configured to process, format, and couple one or more data lines outputted by the ADCs to the plurality of transceivers 108. When the data, which may include instructions indicative of an operating mode, is in a suitable condition, it may be sent to the comparator 106 for sampling/analysis.

The comparator 106, which may be a multichannel comparator, may sample one or more data lines after being processed at the frontend 102. The comparator 106 may sample a measurable characteristic (e.g., voltage) of the data lines in order to identify which communication protocol is being used by the payload 114. In response, the microcontroller 104 may enable the transceiver 108 that communicates via the identified protocol. In some embodiments, obtaining and sampling the data lines may occur when the microcontroller 104 connects to the transceivers 108 and accordingly detects the data lines described below. An example of a measurable characteristic that may be sampled and analyzed to determine which communication protocol to use may be the voltage(s) of the data lines, due to different protocols sending data at different voltage levels.

After sampling the data lines, the comparator 106 may contain logic to compute whether a value of the measurable characteristic satisfies a condition indicative of a particular communication protocol and, if so, output a signal to the microcontroller 104 indicative of which communication protocol has been identified based on the analysis. Examples of communication protocols may include a serial protocol (e.g., RS485 and RS232), a controller area network (CAN) or CAN-based protocol, a National Marine Electronics Association (NMEA) protocol, an Ethernet protocol. These example protocols are non-limiting and for illustrative purposes only. Other suitable protocols may be used without departing from the scope of the invention.

In some embodiments, the comparator 106 may be pre-configured with one or more conditions related to the measurable characteristics. In such cases, when the comparator 106 determines that a value of the measurable characteristics meets a condition, it may output a signal indicating to the microcontroller 104 that the current transceiver 108 being used for communication is no longer suitable and accordingly to enable another transceiver 108.

The transceiver(s) 108 may include components configured to both send (i.e., transmitters) and receive (i.e., receivers) digital signals. In alternative embodiments, transmitters and receivers may be separate components of system 100. The implementation of the transceivers 108 may allow the system to connect to various devices that may send instructions or other information to the system 100 related to one or more operating modes and/or configuration settings of system 100.

As mentioned above, each transceiver 108 of the system 100 may be configured to communicate using a unique communication protocol. Upon the microcontroller 104 selecting a protocol to be used based on the output of the comparator 106, an output signal may be sent to an input of the transceiver 108 that is configured with the selected protocol. In such a case, the transceiver 108 may be enabled. In some embodiments, the microcontroller 104 may be pre-configured to track which transceivers 108 are enabled at any given time (e.g., upon enabling the transceiver 108, the microcontroller 104 may tag it as enabled by flagging a register associated with the transceiver 108).

Embodiments of system 100 may include a plurality of visible and IR LEDs 112 that may be organized into respective groups or sets. The LEDs 112 may be organized based on one or more characteristics of the LEDs which may include a color of the emitted light (e.g., red LEDs in one set and green LEDs in another set), the spectrum of emitted light (e.g., IR LEDs in one set and visible LEDs in another set), and the position on the housing where the LEDs are disposed (e.g., the LEDs on each surface of the housing may be in different sets). Other characteristics or grouping criteria may be used to determine one or more sets of LEDs without departing from the scope of the invention. In some embodiments, each set of LEDs 112 may be connected via a channel to a transceiver 108 configured with a unique protocol. Receiving instructions and other information via the enabled transceiver 108 may allow the system 100 to operate in a selected mode and/or configuration as described further below.

The mode selector 110 may allow the system 100 to control the operating mode(s) of one or more sets of LEDs 112 based on information received via the protocols. The mode selector 110 may, for example, determine to enter a "visible" or "regular" mode wherein all visible LEDs may be powered on and all IR LEDs are powered off. Alternatively, the mode selector 100 may determine to enter a "stealth" mode wherein all visible LEDs may be powered off and all IR LEDs are powered on. A particular mode may include any combination of sets of LEDs 112 powered on or off, and/or one or more other configurable settings of the sets of LEDs 112 (e.g., a brightness, strobe pattern, etc.).

In some embodiments, the system 100 may be deployed on an autonomous, semi-autonomous, or human-controlled vehicle, whereby the system 100 may operate according to the type of vehicle on which the system is deployed. For example, in fully autonomous embodiments, the system 100 may autonomously switch modes and/or configuration settings without human input based on a situational context and/or mission parameters. Some embodiments permit a user to manually select a mode (e.g., via inputting a user request to the system 100) and/or override an autonomously selected mode. For example, a user who is operating or monitoring a vehicle with an embodiment of system 100 deployed thereon may input a command to have the system 100 switch to "stealth" mode at an opportune moment. In another example, the user may want to reduce overall power consumption and input a command to dim the brightness of one or more of the sets of LEDs 112.

In some embodiments, system 100 may contain or be communicatively coupled to one or more photoelectric sensors. The states of the sensors may be periodically reported to the system 100 and trigger the mode selector 110 to switch modes. For example, the states of the sensors may indicate that it has become dark, and consequently the mode selector 110 may be triggered to switch to "visible" mode. Such a feature may be optionally enabled or disabled by a user of system 100. Each time a mode is updated by the mode selector 110, the on/off state, brightness, strobe pattern, etc. of one or more of the set of LEDs 112 may be adjusted accordingly.

The one or more sets of LEDs 112 may be a group of semiconductor diodes, where each diode may glow, or in other words emit light/energy in the form of photons, when a voltage is applied. As described herein, the system 110 may incorporate both visible LEDs as well as IR LEDs, and adjusting each LED's operating mode may be autonomously or manually selected.

In embodiments, one or more payloads 114 may be deployed together with system 100 in a vehicle. The one or more payloads 114 may communicate with the system 100, one or more vehicle navigation and control systems, and one or more other systems disposed on or communicatively coupled to the vehicle (e.g., scientific, surveillance, and/or measurement systems). The payload 114 may determine how to autonomously or semi-autonomously adjust an operating mode of the system 100 given its situational context using, for example, satellite images, reference maps, status of photoelectric sensors, information indicative of mission parameters and/or the like. The payload 114 may also receive human input to manually adjust the operating mode. In embodiments, the vehicle may host a variety of different payloads that communicate using different protocols, and system 100 may be configured to automatically determine the protocol being used by a deployed payload as disclosed in more detail below.

Figure 1B:
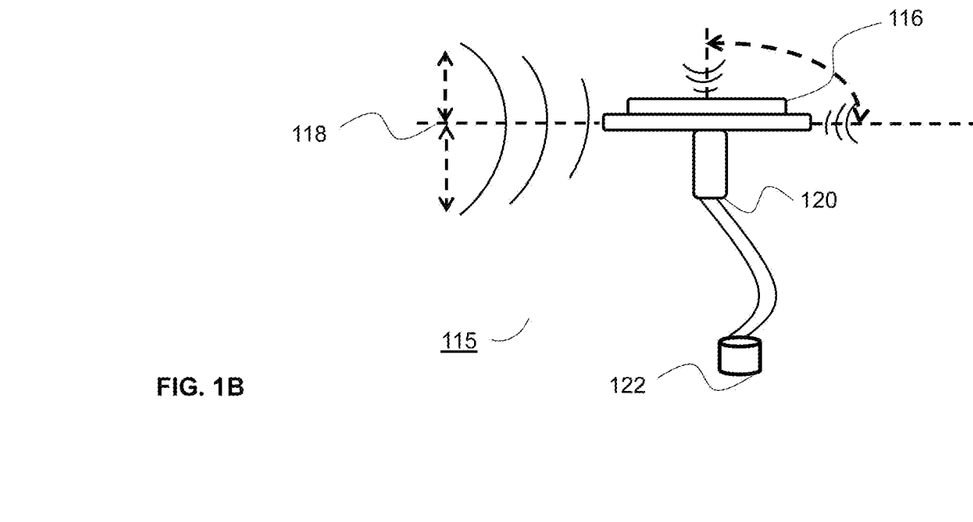
FIG. 1B shows an exemplary side-view of an embodiment of a multichannel navigation light system.

FIG. 1B shows an exemplary side-view of a multichannel navigation light 115. One or more parts of system 100 may be embodied in the multichannel navigation light 115. Embodiments of the multichannel navigation light 115 may include one or more sets of IR LEDs 116, one or more sets of visible LEDs 118, a mounting base 120, and one or more cables with a multi-conductor pinout 122. Examples of vehicles that may deploy the multichannel navigation light 115 include a boat, an aircraft, a drone, an automobile, and/or any other autonomous, semi-autonomous, or human-controlled vehicle.

The one or more sets of IR LEDs 116 may be disposed on the outer surface of the multichannel navigation light 115 such that IR light is emitted and is visible from a one or more sides, wherein a side can be any surface of a three-dimensional shape. In some embodiments, the IR LEDs may be positioned on a top surface, one or more side surfaces, and/or a bottom surface. In some embodiments, the IR LEDs 116 disposed on the top surface of the device may act as a beacon whereupon the system may enter a "stealth" mode in which only one or more sets of IR LEDs 116 are powered on. In some embodiments, the IR LEDs 116 may act in collaboration with an IR locator which may be third-party receiver that can pinpoint the location of the vehicle based on the emitted IR energy. For example, the IR LEDs 116 may be configured to emit a unique IR pattern (series of IR pulses) while deployed. The IR locator, which may be a receiver, may be capable of detecting and interpreting these emitted pulses. Additionally, the IR locator may be pre-configured with identifying information indicative of this unique pattern. By comparing the patterns of the real-time emitted pulses with the pre-configured information, the IR locator may be able track the vehicle.

One or more sets of visible LEDs 118 may be disposed on the outer surface of the multichannel navigation light 115 such that visible light is emitted and is visible from a one or more sides or surfaces. In some embodiments, the visible LEDs may be positioned on a top surface, one or more side surfaces, and/or a bottom surface. The layout of both the visible LEDs 118 and IR LEDs 116 and why such a layout is significant is described further with respect to FIG. 2. The LEDs may be disposed on one or more rigid and/or flexible circuit boards surrounding a core or body affixed to a mounting base 120.

The mounting base 120 may be a mechanical instrument used to secure the multichannel navigation light 115 to a vehicle. In some embodiments, how and where the device is mounted may impact the system's determination on how to set the modes for each of the one or more sets of LEDs. For example, two identical devices may be deployed on an aircraft, where one of the devices may be mounted on the left wing of the aircraft while the other is mounted on the right wing. Based on the wing where each multichannel navigation light 115 is mounted, only certain visible LEDs 118 (e.g., green or red) may be activated. The mounting base 120 may additionally contain wire management sub-components for routing and securing the one or more cables to a payload and/or a vehicle control system.

The one or more cables with the multi-conductor pinout 122 may be customized or fabricated such that the system may receive data from a wide range of payloads with differing power and communication protocols. The pinout 122 may include an arrangement (i.e., specifying which pin is used for which signal or voltage) of physical pins or sockets that contact with the respective sockets or pins of the payload and/or vehicle control system. Embodiments of the multichannel navigation light 115 comprise an ability to identify the protocol used by the connected payload, as described in more detail below. The incorporation of multiple transceivers individually configured to communicate via different protocols provides flexibility to process and handle a wide range of payloads. Additionally, this feature may provide "plug-and-play" functionality where the multichannel navigation light 115 may be connected to a payload and/or vehicle control system without further human intervention. For example, the multichannel navigation light 115 may recognize that a payload operates using a standard controller area network (CAN) protocol, and may enable a transceiver that is configured to communicate via the respective protocol. In such a case, the data ingress mode of the corresponding channel/interface may be updated to a "CAN" state when handling any messages sent from the payload. An example of the designations for each pinout of the one or more cables may be: one pinout for common ground, one for the voltage of visible LEDs, one for the voltage of the IR LEDs, and two data pins for selecting and/or configuring one or more operating modes.

Figure 2:
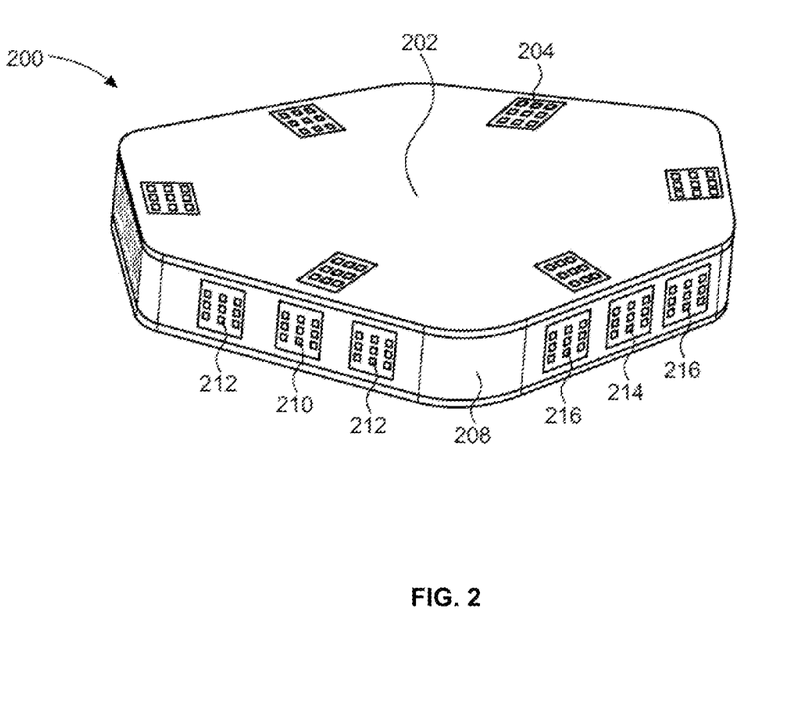
FIG. 2 shows an exemplary perspective view of an embodiment of a multichannel navigation light system.

FIG. 2 shows an exemplary perspective view of an embodiment of a multichannel navigation light 200, inclusive of a plurality of surfaces of the housing, which may each include one or more sets of LEDs 206 and 208. The components of the multichannel navigation light 200 may be fabricated, or otherwise configured, so as to make the multichannel navigation light 200 waterproof. For example, the components may be molded with a material, such as a soft epoxy, that prevents the multichannel navigation light 200 from becoming water-damaged. In some embodiments, an outer shell may enclose the multichannel navigation light 200 so as to form an air bubble that acts as a safeguard from any surrounding liquid.

A top surface 202 may include a printed circuit board (PCB) that may be rigid or disposed on a rigid material. For example, the top PCB may be affixed to the top surface 202 of a core of the housing via a thermal adhesive. The core may be made of a suitable material, such as aluminum. Attaching the top PCB via a thermal adhesive may improve thermal dissipation, which may prevent the device from overheating and other problems experienced as a device reaches higher than expected temperatures. The top PCB may be used (in combination with the flexible PCB described below) as the means that connects the various components of the system (for example, those described with respect to FIG. 1A) in the form of a circuit (e.g., using general circuitry customarily used in PCBs). The top PCB may additionally utilize a plurality of switching regulators which may be responsible for converting input voltages (e.g., direct current (DC) voltage) from a battery or other power source to a voltage that can be handled by the system. While a PCB is used as an example herein, alternative hardware components that create circuitry connections similar to connections made using the PCB (e.g., such as a wire wrap, a point-to-point construction, and/or the like) may be included and utilized by the multichannel navigation light 200. The top PCB may contain one or more sets of IR and/or visible LEDs. For example, top PCB 202 comprises one or more IR LEDs 204. The top PCB may operate in combination with one or more side PCBs, as described below.

The multichannel navigation light 200 may comprise a plurality of side surfaces, with one or more side PCBs disposed thereon. In embodiments a single flexible or semi-flexible PCB is wrapped around the core of the multichannel navigation light 200 and affixed via a thermal adhesive. In other embodiments, two or more flexible or rigid PCBs are wrapped around the core of the multichannel navigation light 200.

The multichannel navigation light 200 may be in the shape of a pentagon, a hexagon, an octagon, or another shape with a number of sides suitable for the task in which the multichannel navigation light 200 will be used. By incorporating a PCB that is capable of wrapping around the multichannel navigation light 200 with numerous sides, each side can host one or more sets of LEDs that emit light in respective directions. The number and positioning of the LEDs may be optimized to result in more effective and efficient light emissions, as explained more thoroughly below.

The one or more sets of LEDs disposed on one or more side PCBs of the multichannel navigation light 200 may consist of at least one IR LED and at least one visible LED. For example, as shown in FIG. 2, one or more first surfaces of side PCB 208 may host a set of LEDs consisting of one IR LED 210 between two green LEDs 212. One or more second surfaces of side PCB 208 may host a set of LEDs consisting of one IR LED 214 between two red LEDs 216. One or more other surfaces of side PCB 208 may host a set of LEDs consisting of one IR LED between two white LEDs. Any number of side surfaces of side PCB 208 may host one or more sets of LEDs consisting of one or more IR and/or visible LEDs. In some embodiments, one or more sets of LEDs may be disposed on all side surfaces of side PCB 208, providing 360 degrees of light emission.

Using a geographic shape with more sides permits the multichannel navigation light 200 to use LEDs with narrower beam angles compared to shapes with less sides. For example, with a triangular shape, in order to capture 360 degrees of light emission on the horizontal plane, each LED would need a beam angle of 120 degrees. Because light is emitted in a cone, more light would be "wasted" with 120 degree beam angles, especially when deployed on a boat, because much of it would be shining directly into the water. LEDs with wider beam angles also require more power and produce more heat. A hexagonal shape, on the other hand, requires LEDs with only 60 degree beam angles, thereby improving the overall efficiency of the multichannel navigation light 200.

Figure 3:
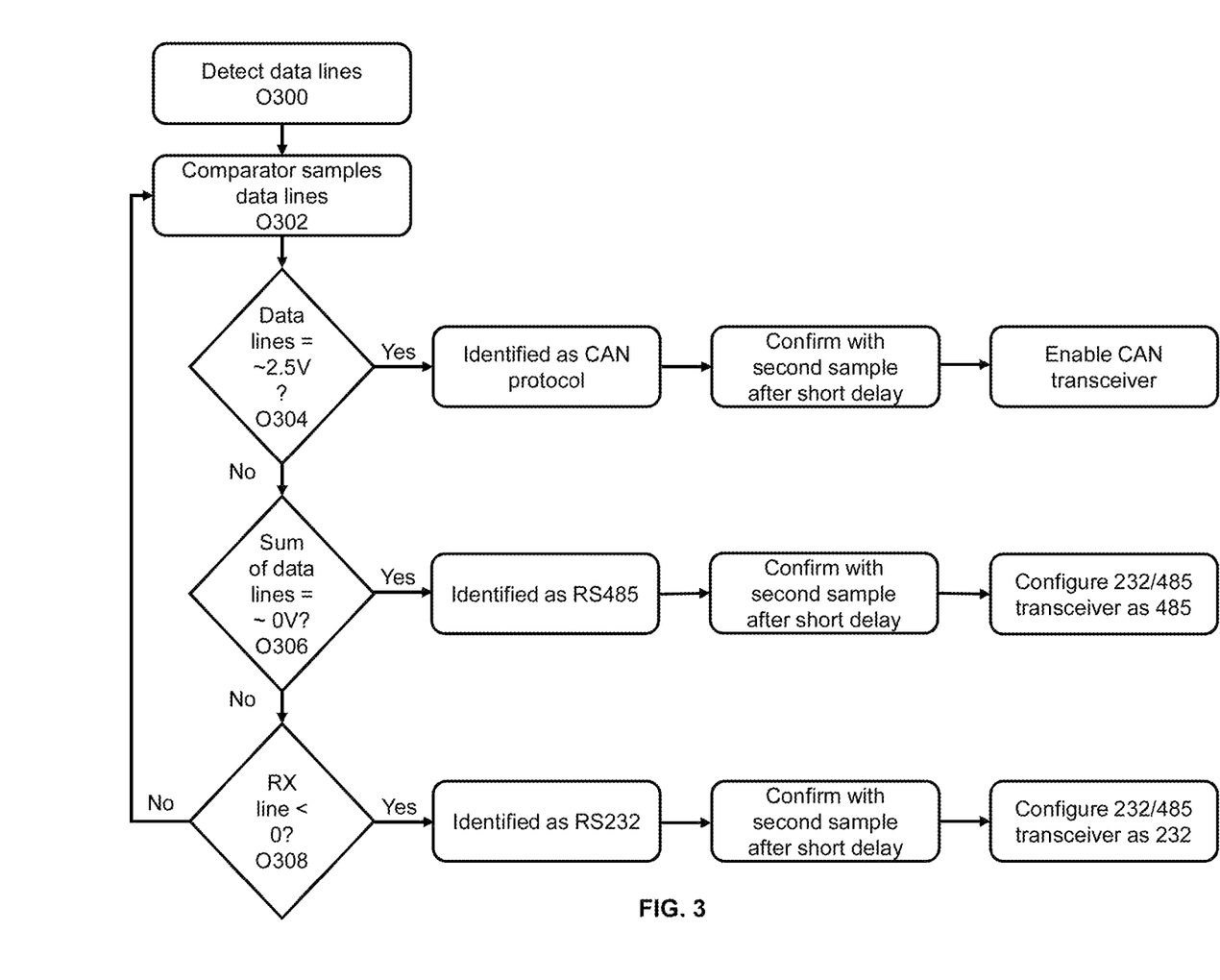
FIG. 3 shows an exemplary diagram of a process for determining a communication protocol in embodiments of a multichannel navigation light system.

FIG. 3 shows an exemplary diagram of determining which communication protocol to use when sending communications based on an analysis of sampled voltages of detected data lines. At operation 300, the presence of one or more data lines may be detected. At operation 302, one or more sample voltages of the one or more data lines may be ascertained and tested by the comparator to determine the appropriate protocol. Depending on the number of protocols being considered (and the corresponding transceivers provided), one or more different voltage conditions may be used. The one or more voltage conditions may be associated with a single data line, the sum of voltages on two or more data lines, a combination thereof, or any other relationship between sampled voltage(s) and particular protocols. For example, in the routine described in FIG. 3, three conditions are used to distinguish between three protocols (i.e., a CAN-based protocol, an RS485 serial protocol, and an RS232 serial protocol). Any number of sample voltages, conditions, comparisons, and protocols may be used, provided that the protocols are distinguishable by their respective voltages, without departing from the scope of the invention.

At operation 304, it may be determined whether the one or more sample voltages satisfy a first condition. In this example embodiment, the first condition is whether one or more sample voltages from two data lines equals a value associated with a first protocol (e.g., approximately "2.5"). If the first condition is satisfied, the data lines may be identified as, for example, utilizing a CAN-based protocol, which may be confirmed with a second set of sample voltages. After being confirmed, the transceiver associated with the CAN-based protocol may be enabled. If it is determined that the sample voltages do not satisfy the first condition, then at operation 306 the comparator may determine whether the sample voltages satisfy a second condition. In this example embodiment, the second condition is whether the sum of the sample voltages from two data lines equals a value associated with a second protocol (e.g., approximately "0"). If yes, the data lines may be identified as utilizing an RS485 protocol, which may be confirmed with a second set of sample voltages. After being confirmed, the transceiver associated with the 232/485 multi-protocol may be enabled and configured as "485." If it is determined that the sample voltages do not satisfy the second condition, then at operation 308 the comparator may determine whether the sample voltages satisfy a third condition. In this example embodiment, the third condition is whether one of the sample voltages (e.g., the sample voltage of a receiver or "RX" line) is less than 0. If yes, then the data lines may be identified as utilizing an RS232 protocol, which may be confirmed with a second set of sample voltages. After being confirmed, the transceiver linked to the 232/485 multi-protocol may be enabled and configured as "232." If the one or more sample voltages do not satisfy the third condition, then the comparator may determine that no protocol has been identified, and another set of data lines and/or a different set of protocols may be tested using a similar procedure.

Figure 4:
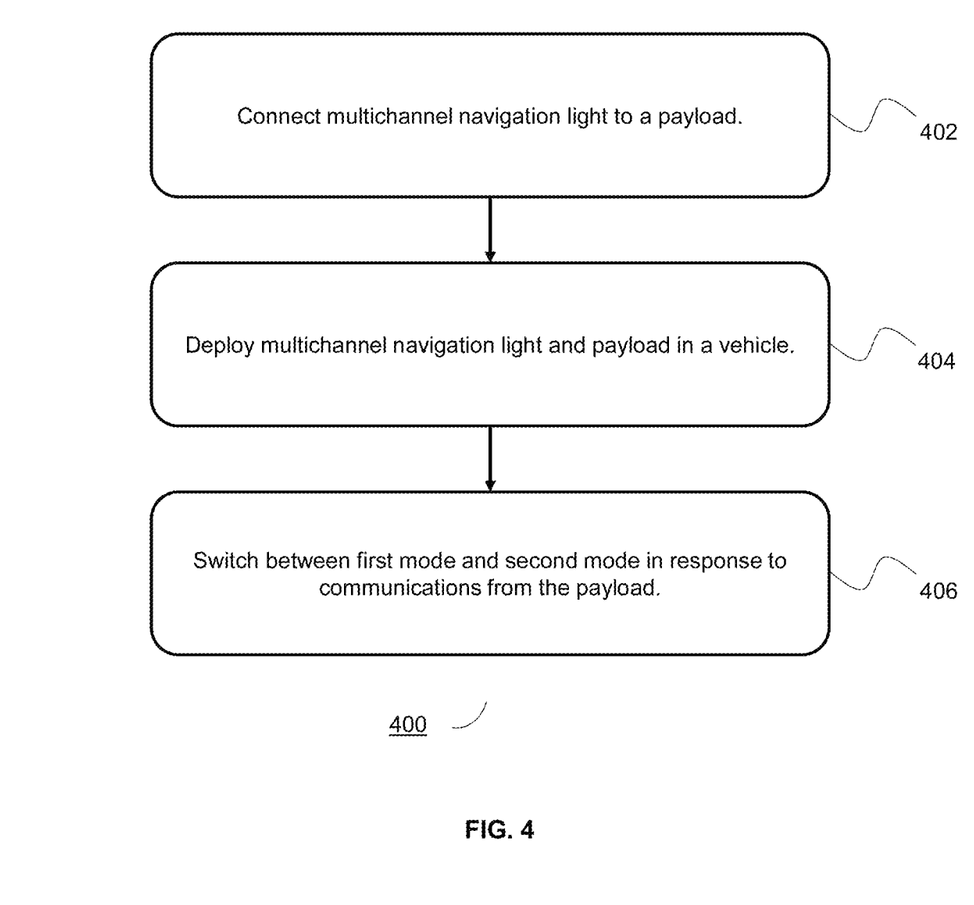
FIG. 4 depicts a flowchart of an exemplary routine for utilizing a multichannel navigation light with a payload in a vehicle.

FIG. 4 depicts a flowchart of an exemplary routine 400 for utilizing a multichannel navigation light with a payload in a vehicle. The routine 400 may start at block 402, which includes the step of connecting a multichannel navigation light (e.g., multichannel navigation light 200) to a payload. At block 404, the multichannel navigation light and payload may be deployed to a vehicle (e.g., an autonomous or semi-autonomous vehicle). At block 406, the multichannel navigation light may switch between a first mode (e.g., IR LEDs are powered on and visible LEDs are powered off) and a second mode (e.g., IR LEDs are powered off and visible LEDs are powered on) based on communications from the payload.

The general discussion of this disclosure provides a brief, general description of a suitable environment in which the present disclosure may be implemented. In some cases, any of the disclosed systems, methods, and/or graphical user interfaces may be executed by or implemented by a system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multichannel navigation light system, comprising:
   a housing, the housing comprising at least one top surface and a plurality of side surfaces;
   a plurality of infrared light emitting diodes;
   a plurality of visible light emitting diodes;
   at least one rigid printed circuit board, wherein the at least one rigid printed circuit board is affixed to the at least one top surface, and wherein the at least one rigid printed circuit board comprises at least one of the plurality of infrared light emitting diodes;
   at least one flexible printed circuit board, wherein the at least one flexible printed circuit board is affixed to the plurality of side surfaces, and wherein the at least one flexible circuit board comprises at least one infrared light emitting diode and at least one visible light emitting diode for each of the plurality of side surfaces;
   a microcontroller;
   a plurality of transceivers, the plurality of transceivers comprising at least a first transceiver that communicates using a first protocol and a second transceiver that communicates using a second protocol that is different from the first protocol;
   a comparator, wherein the comparator is configured to sample one or more voltages of one or more data lines connected to the plurality of transceivers and compare the one or more voltages to one or more conditions, wherein the microcontroller enables one of the first transceiver or the second transceiver based on the comparison to the one or more conditions;
   wherein the multichannel navigation light system is operable in at least a first mode and a second mode, wherein in the first mode the plurality of infrared light emitting diodes are powered on and the plurality of visible light emitting diodes are powered off, wherein in the second mode the plurality of infrared light emitting diodes are powered off and the plurality of visible light emitting diodes are powered on, and wherein the multichannel navigation light system is switchable between the first mode and the second mode using one of the first protocol and the second protocol based on whether the first transceiver or the second transceiver is enabled.

2. The system of claim 1, wherein the multichannel navigation light system is configured to switch from operating in the first mode to operating in the second mode based on one or more communications received from a payload.

3. The system of claim 2, wherein the microcontroller is configured to automatically enable one of the first transceiver or the second transceiver based on a protocol used for the one or more communications received from the payload.

4. The system of claim 2, wherein the payload is deployed on a vehicle selected from the group of a boat or an aircraft.

5. The system of claim 4, wherein the vehicle is fully autonomous.

6. The system of claim 1, wherein the first transceiver communicates using one of a serial protocol, a controller area network protocol, a National Marine Electronics Association protocol, or an Ethernet protocol.

7. The system of claim 1, wherein the first transceiver is a multiprotocol serial transceiver that communicates using one of a plurality of a serial protocols.

8. The system of claim 1, wherein the one or more conditions comprise at least a first condition and a second condition, wherein the first condition is whether a sampled voltage from each of two data lines equals a first value, wherein the second condition is whether a sum of a sampled voltage from a first data line and a sampled voltage from a second data line equals a second value, wherein if the first condition is satisfied, the microcontroller enables the first transceiver, and wherein if the second condition is satisfied, the microcontroller enables the second transceiver in a first mode.

9. The system of claim 8, wherein the one or more conditions comprise at least a third condition, wherein the third condition is whether a sampled voltage from a receiver data line is less than a third value, and wherein if the third condition is satisfied, the microcontroller enables the second transceiver in a second mode.

10. The system of claim 1, wherein the at least one flexible printed circuit board comprises at least one red light emitting diode on a first side surface of the plurality of side surfaces, at least one green light emitting diode on a second side surface of the plurality of side surfaces, and at least one white light emitting diode on a third side surface of the plurality of side surfaces.

11. A method for operating a multichannel navigation light system, comprising:
    connecting the multichannel navigation light system to a payload;
    deploying the multichannel navigation light system and the payload in a vehicle;
    wherein the multichannel navigation light system comprises:
    a housing, the housing comprising at least one top surface and a plurality of side surfaces;
    a plurality of infrared light emitting diodes;
    a plurality of visible light emitting diodes;
    at least one rigid printed circuit board, wherein the at least one rigid printed circuit board is affixed to the at least one top surface, and wherein the at least one rigid printed circuit board comprises at least one of the plurality of infrared light emitting diodes;
    at least one flexible printed circuit board, wherein the at least one flexible printed circuit board is affixed to the plurality of side surfaces, and wherein the at least one flexible circuit board comprises at least one infrared light emitting diode and at least one visible light emitting diode for each of the plurality of side surfaces;

a microcontroller;

a plurality of transceivers, the plurality of transceivers comprising at least a first transceiver that communicates using a first protocol and a second transceiver that communicates using a second protocol that is different from the first protocol;

a comparator, wherein the comparator is configured to sample one or more voltages of one or more data lines connected to the plurality of transceivers and compare the one or more voltages to one or more conditions, wherein the microcontroller enables one of the first transceiver or the second transceiver based on the comparison to the one or more conditions;

wherein the multichannel navigation light system is operable in at least a first mode and a second mode, wherein in the first mode the plurality of infrared light emitting diodes are powered on and the plurality of visible light emitting diodes are powered off, wherein in the second mode the plurality of infrared light emitting diodes are powered off and the plurality of visible light emitting diodes are powered on, and wherein the multichannel navigation light system is switchable between the first mode and the second mode using one of the first protocol and the second protocol based on whether the first transceiver or the second transceiver is enabled; and switch between the first mode and the second mode in response to one or more communications from the payload.

12. The method of claim 11, wherein the microcontroller is configured to automatically enable one of the first transceiver or the second transceiver based on a protocol used for the one or more communications received from the payload.

13. The method of claim 11, wherein the vehicle is selected from the group of a boat or an aircraft.

14. The method of claim 13, wherein the vehicle is fully autonomous.

15. The method of claim 11, wherein the first transceiver communicates using one of a serial protocol, a controller area network protocol, a National Marine Electronics Association protocol, or an Ethernet protocol.

16. The method of claim 11, wherein the first transceiver is a multiprotocol serial transceiver that communicates using one of a plurality of a serial protocols.

17. The method of claim 11, wherein the one or more conditions comprise at least a first condition and a second condition, wherein the first condition is whether a sampled voltage from each of two data lines equals a first value, wherein the second condition is whether a sum of a sampled voltage from a first data line and a sampled voltage from a second data line equals a second value, wherein if the first condition is satisfied, the microcontroller enables the first transceiver, and wherein if the second condition is satisfied, the microcontroller enables the second transceiver in a first mode.

18. The method of claim 17, wherein the one or more conditions comprise at least a third condition, wherein the third condition is whether a sampled voltage from a receiver data line is less than a third value, and wherein if the third condition is satisfied, the microcontroller enables the second transceiver in a second mode.

19. The method of claim 11, wherein the at least one flexible printed circuit board comprises at least one red light emitting diode on a first side surface of the plurality of side surfaces, at least one green light emitting diode on a second side surface of the plurality of side surfaces, and at least one white light emitting diode on a third side surface of the plurality of side surfaces.

20. The method of claim 11, wherein the one or more communications from the payload are autonomously issued based on one or more mission parameters of the vehicle.

* * * * *